No. 886,667.  
PATENTED MAY 5, 1908.  
A. W. WIGGLESWORTH.  
CLUTCH.  
APPLICATION FILED OCT. 9, 1907.  
2 SHEETS—SHEET 1.
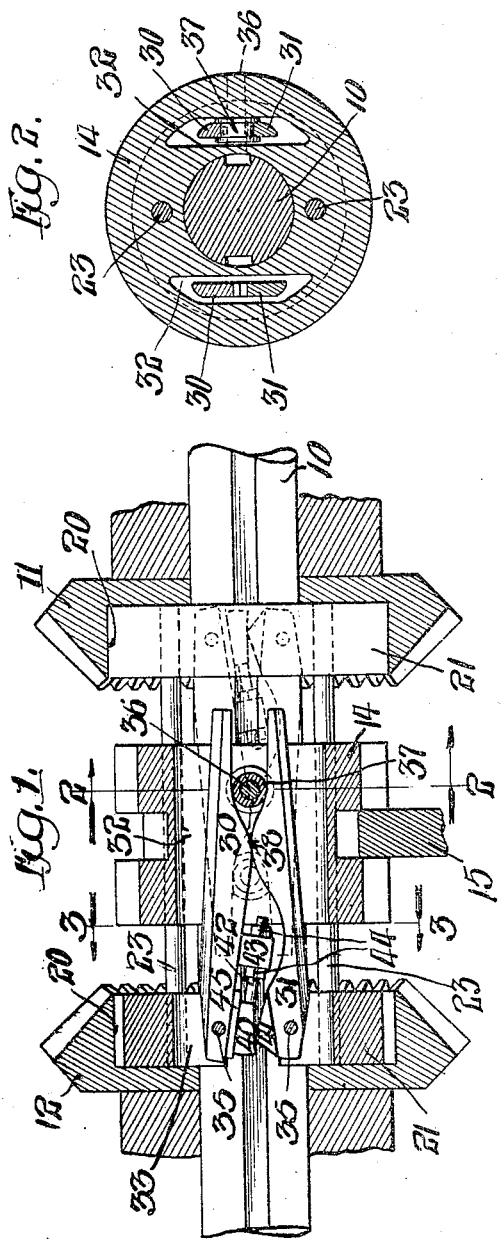
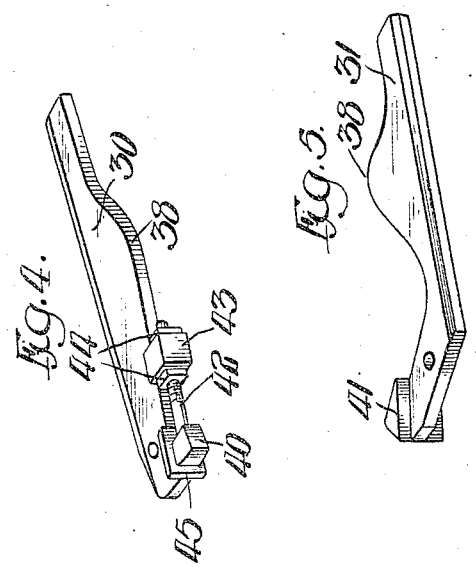
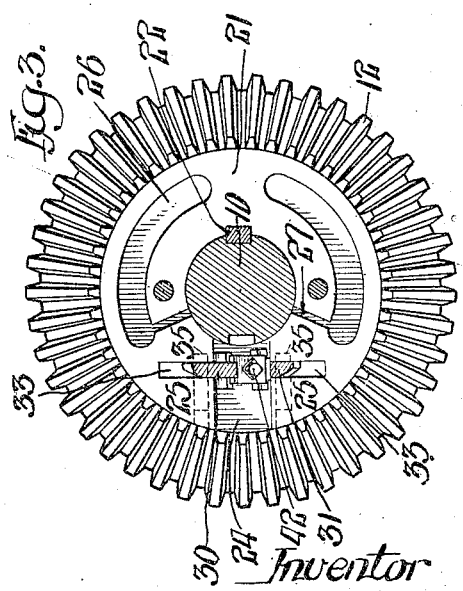
Inventor  
Albert W. Wigglesworth  
by Poole & Brown  
Attys
Witnesses:

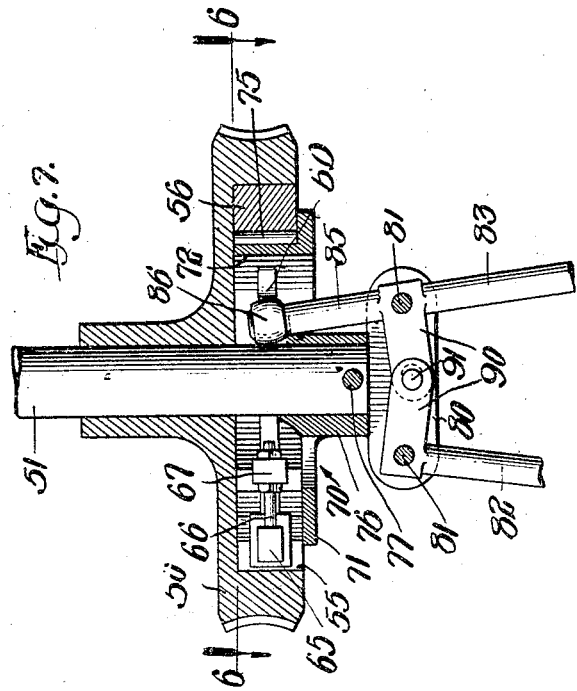

UNITED STATES PATENT OFFICE.

ALBERT W. WIGGLESWORTH, OF CHICAGO, ILLINOIS.

CLUTCH.

No. 886,667.  Specification of Letters Patent.  Patented May 5, 1908.

Original application filed May 31, 1907, Serial No. 376,686. Divided and this application filed October 9, 1907. Serial No. 396,584.

*To all whom it may concern:*

Be it known that I, ALBERT W. WIGGLESWORTH, a citizen of the United States, and a resident of Chicago, in the county of Cook and State of Illinois, have invented certain new and useful Improvements in Clutches; and I do hereby declare that the following is a full, clear, and exact description thereof, reference being had to the accompanying drawings, and to the letters of reference marked thereon, which form a part of this specification.

This invention relates to improvements in clutch devices for fixing a normally loose gear wheel or other part to a shaft on which it is mounted, and the invention consists in the matters hereinafter set forth and more particularly pointed out in the appended claims.

Among the objects of my invention is to provide a clutch device of simple and inexpensive construction for locking a gear wheel or the like to its shaft, the parts being so arranged as to exert a powerful frictional or clutching engagement with the use of comparatively small manually applied power to operate the clutch.

A further object of the invention is to provide an improved means for adjusting the clutch to compensate for wear.

Other objects of the invention will appear from the description which follows.

The clutch device herein shown is designed to be applied to a drilling machine of that type illustrated in my prior application for United States Letters Patent Serial Number 376,686 filed May 31st, 1907, of which this application is a division, but it may obviously be applied to other uses.

In the drawings:—Figure 1 is a central longitudinal section of one form of the clutch device made in accordance with my invention. Figs. 2 and 3 are transverse sections, taken on lines 2—2 and 3—3, respectively, of Fig. 1. Figs. 4 and 5 are perspective views of clutch actuating fingers employed in the clutch device shown in Fig. 1. Fig. 6 illustrates another adaptation of my clutch device applied to the feed mechanism of a drilling machine of the character shown in my aforesaid application, said section being taken on line 6—6 of Fig. 7 and looking downwardly. Fig. 7 is an axial section thereof. Figs. 8 and 9 are perspective views of the clutch actuating fingers employed in the clutch shown in Fig. 6.

First describing the construction shown in Figs. 1 to 5, inclusive, 10 designates a shaft and 11 and 12 designate oppositely facing beveled gears mounted thereon. Said gears are normally loose on the shaft and designed to be locked thereto by the clutch device herein shown. Said gears 11, 12 may mesh with two like gears to alternately drive them in the same direction, or they may mesh with a single bevel gear in a manner to reverse the rotation of said single gear and the parts driven thereby. The latter arrangement is shown in my prior application before referred to. 14 designates a spool which has sliding movement on the shaft between the gears 11 and 12 and is adapted to be shifted toward one or the other of said gears through the medium of a shifting lever 15 to separately lock said gears to the shaft, one of the gears being loose on the shaft while the other is locked thereto.

The gears 11 and 12 are formed on their inner faces to provide recesses having cylindric, inwardly facing friction faces 20. Contained within each of said recesses is an expanding friction clutch member 21 having an exteriorly cylindric friction face adapted to be forced into frictional engagement with the friction face 20 of the gear. Each friction member comprises a circular plate or disk fixed by a key 22 to the driving shaft 10, said key engaging opposing grooves formed in said shaft and friction member. In the construction shown the friction members 21 carry pins 23, 23 extending between and fixed at their ends in said member and also extending through openings in the spool to fix the spool non-rotatively to the shaft. Each friction member is cut away at one side thereof from its periphery to its axial bore, as indicated by $24_1$ so that the parts at the opposite sides of said cutaway portion constitute what may be termed two arms 25, 25 of a clutch ring, and are adapted to be spread outwardly to bring their outer cylindric faces into frictional contact with the inner cylindric face of the surrounding gear. Each clutch member is also cut away at 26 and 27 in the manner shown in Fig. 3 so as to weaken the arms thereof and permit them to be spread outwardly by the power available for this purpose, while affording a central part by which the member may be firmly attached to the shaft 10. The resiliency of the clutch members hold them normally out of clutching engagement with the gears. They are expanded outwardly into clutching engagement with the friction surface of the gears by means made as follows: 30, 31 designate clutch actuating fingers, of which there are two pairs, one pair at each side of the shaft 10, as indicated in full and dotted lines in Fig. 1. The fingers of each pair extend through lateral openings 32 in the clutch spool 14 and the ends of said fingers enter openings 33 in the clutch members 21. The said openings 33 of the clutch members open into the spaces 24 dividing the arms of the clutch members, and the fingers 30 and 31 partially occupy said openings 24. The said fingers are pivoted in the openings 33 by pivot pins 35 and are fulcrumed one on the other near their pivoted ends in such manner that when the opposite ends of the fingers are separated or spread apart the lever action of the fingers operates to expand the arms of the clutch rings outwardly to bring their friction faces in frictional or clutching engagement with the friction faces of the gears to lock the gears to the shaft. The inner ends of the clutch fingers are spread apart to thus expand the clutch member by pins 36 extending transversely across the openings 32 of the clutch spool into the spaces between the ends of said fingers and said pins are provided with bearing rollers 37 which engage the inner or adjacent margins of said fingers. The said inner or adjacent margins of the fingers are formed to provide curved lateral extensions 38 having their convex surfaces facing inwardly and in contact with each other at points between said pins and their pivoted ends at a time when the clutch is in its inoperative or unlocking position. Thus when the clutch spool is moved endwise with respect to the fingers the bearing roller of one of the pins acts on the curved margins of the lateral extensions of the associated fingers to separate or spread apart said fingers, with the result of expanding the clutch member towards which the spool is shifted.

The manner of fulcruming the fingers one upon the other constitutes an important feature of my invention, the parts being constructed and arranged as follows: 40, 40 designate wedge-shaped blocks interposed one between the fulcrum ends of each pair of fingers. The block of each pair is carried by one of the fingers of said pair, the fingers 30, as herein shown. The inclined faces of the blocks converge inwardly toward the opening pins 36 carried by the clutch spool. The other fingers 31 are provided opposite to the blocks with bearing portions 41 which bear against the adjacent inclined faces of the blocks 40. The said bearing portions are herein shown as more or less pointed, but may be otherwise shaped. The blocks 40 are attached to the fingers 30 by means of screw-threaded shanks 42 thereon which extend through the apertures of apertured lugs 43 formed on said fingers 30, said shanks being locked to the lugs by lock nuts 44. The inner margins of the fingers 31 are cut away to afford spaces to receive the lugs 43. The faces of said blocks opposite to those engaged by the lugs 41 lie against flat seats 45 on the fingers 30 and slide inwardly on said seats. By movement of said blocks inwardly, which is effected through the screw-action of the shanks and nuts 44, the device is adjusted to compensate for wear of the friction surfaces of the clutch elements.

The advantage of arranging the adjusting blocks 40 with their tapered ends facing inwardly is that the outwardly inclined faces of the blocks against which the fingers 31 bear avoid tendency of the bearing ends of the fingers from slipping outwardly on blocks when the fingers are spread apart to expand the clutch rings. The arrangement is such that the bearing contact between the fingers 31 and blocks are approximately equidistant from the pivots of the fingers, and this proportion is maintained throughout the range of adjustment of the blocks 40. The said points of bearing contact between the blocks and fingers are substantially in a plane which cuts said points and the axis of the spreading studs 36. The adjusting shanks of said blocks are disposed obliquely to such plane and this relation of the parts is maintained throughout the range of adjustment of the blocks. An advantage of the construction described is that the adjusting devices of the shanks of said blocks (the nuts 44, as herein shown) are readily accessible, they being located a substantial distance from the fulcrum points of the fingers and between the levers. Thus the clutch is adaptable for use in a hollow beveled gear, as herein shown, and other relatively inaccessible locations without the necessity of cutting away any part of the gear or other like part to afford access to the adjusting devices.

The form of clutch device shown in Figs. 6 to 9, inclusive, is adapted for use in locations where the spreading movement of the fingers is in the plane of the clutch ring or member. It is shown in said last mentioned figures as adapted to lock the automatic feed worm wheel 50 to the feed shaft 51 of a drilling machine. The feed worm wheel is recessed on its under side to provide a chamber having a cylindric inner face 55 and within the chamber or recess is contained a clutch member or ring 56, the outer cylindric face of which is adapted for frictional engagement with the inner cylindric face 55 of said chamber or recess. The said ring or clutch member is divided at 58, thus constituting the parts of the ring at each side of said division two spring arms 59, 59 which are adapted to be spread apart to bring the cylindric friction face of the ring into frictional engagement with the cylindric inner face 55 of the worm wheel recess. Such spreading of the spring arms of the clutch ring or member is effected by means of clutch actuating fingers 60, 61 generally similar to the clutch actuating fingers 30, 31 before described. Said clutch actuating fingers 60, 61 are, in this instance, contained within the recess of the worm wheel and have movement in the plane of the clutch ring. Said clutch actuating fingers enter at their outer ends suitable notches formed in the ends of the spring arms of the clutch ring and they are pivoted to said arms by pivot pins 62. One of said fingers, the finger 61, is provided with a conical shaped projection or lug 64 which bears against one of the faces of an inwardly converging wedge block 65 carried by the finger 60. Said wedge block is fixed to the finger 60 by a screw shank 66 locked to a lug 67 on said finger in the same manner as in the construction before described, thus providing for adjustment of the fulcrums of the fingers to compensate for wear of the friction surface of the clutch ring and wheel. The ends of the fingers remote from the fulcrums are cut away or curved outwardly on their inner margins to provide a space through which extends the feed shaft 51. The extreme ends of said fingers are curved toward each other and meet in the plane of the axis of said shaft.

70 designates a spider frame comprising a flat plate 71 which fits flat against the lower side of the clutch ring and is provided with a curved flange 72, concentric with the axis of the worm wheel, which extends into the space surrounded or inclosed by the clutch ring. Said flange fits closely within inwardly projecting parts or lugs 73 of said ring, as shown in Fig. 6. In order to prevent said spider and clutch ring from angularly shifting relatively to each other the said parts are provided at the point of contact of the flange of said spider with one of the projections 73 of the clutch ring with an opening formed half in one part and half in the other, and a pin 75 fitting in said opening affords an interlocking connection between the parts. The said spider is provided with a central hub 76 which fits upon the end of the shaft below the worm wheel and is fixed to the shaft by means of a removable pin 77 extending transversely through the hub and the shaft.

Depending from the hub is a cross-head or flange 80 to which are pivoted, by means of pivot pins 81, 81, hand levers 82, 83 which constitute means whereby the feed shaft may be rotated independently of the worm wheel when the clutch is released. The hand lever 83 also constitutes means for actuating the clutch device and, to that end, is provided with a prolongation 85 which extends upwardly between the inwardly curved ends of the fingers 60 and 61. Said prolongation is provided with a bearing roller 86 which engages the inner curved margins of said fingers. When said levers are pressed together therefore the upper end 85 of the lever 83 swings outwardly and acts to spread or force the curved ends of the clutch actuating fingers outwardly, thereby actuating the clutch to lock the worm wheel to the shaft. When the free ends of the levers 82, 83 are spread apart and the clutch released, said levers serve as handles to rotate the feed shaft.

Means are provided for locking the levers 82, 83 in position to hold the clutch in its locking position, comprising rigid arms 90, 90 on said levers which extend inwardly towards each other and are pivotally joined by a pivot pin 91 extending transversely through the overlapping inner ends thereof. Thus when the levers are swung toward each other to actuate the clutch the pivoted ends of said arms are raised above the plane of the pivot studs 81, 81 thus locking the levers from swinging outwardly.

I claim as my invention:—

1. In a clutch, the combination with a clutch member, fingers pivoted to said clutch member and fulcrumed one on the other near their pivoted ends, and fulcrum-adjusting means between the pivoted ends of the fingers and movable endwise of and relatively to the fingers.

2. In a clutch, the combination with a clutch member, fingers pivoted to said clutch member and fulcrumed one on the other near their pivoted ends, and fulcrum-adjusting means carried by one of the fingers and movable endwise of and relatively to the fingers.

3. In a clutch, the combination with a clutch member, fingers pivoted to said clutch member, an adjustable fulcrum piece between said fingers movable endwise thereof and means situated a distance from the fulcrum point, longitudinally of the fingers, for actuating said fulcrum piece.

4. In a clutch, the combination with a clutch member, fingers pivoted to said clutch member and an inwardly tapered, adjustable fulcrum block between said fingers at the pivoted ends thereof.

5. In a clutch, the combination with a clutch member, fingers pivoted to said clutch member and an inwardly tapered, adjustable fulcrum block between said fingers at the pivoted ends thereof, and means located between said block and the spreading ends of said fingers for actuating said block, for the purpose set forth.

6. In a clutch, the combination with a clutch member, fingers pivoted to said clutch member and an inwardly tapered, adjustable fulcrum block between said fingers at the pivoted ends thereof, and means for spreading the swinging ends of said fingers, the fulcrum point of said fingers being located substantially in line with the spreading means.

7. A clutch device comprising, in combination with a shaft and a gear or the like loosely mounted thereon, a clutch member non-rotatively fixed to the shaft and provided with a friction face adapted to engage a complemental friction face of said gear, two clutch actuating fingers pivotally mounted on said clutch member, said fingers being fulcrumed one on the other adjacent to their pivots, means acting to spread the other ends of said fingers apart, and adjusting means movable longitudinally of said fingers to compensate for wear of the friction clutch faces.

8. A clutch device comprising, in combination with a shaft and a gear or the like loosely mounted thereon, a divided ring clutch member non-rotatively fixed to the shaft and provided with an external cylindric friction face adapted to engage an internal cylindric friction face of the gear, two fingers pivotally mounted in the ends of said divided ring clutch member and fulcrumed one on the other adjacent to their pivots, means acting to spread the other ends of the fingers apart, and adjusting means movable endwise of the fingers to compensate for wear of the friction faces.

9. A clutch device comprising, in combination with a shaft and a gear or the like loosely mounted thereon, a clutch member non-rotatively fixed to the shaft and provided with a friction face adapted to engage a complemental friction face of said gear, two fingers pivotally mounted on said clutch member and fulcrumed one on the other adjacent to their pivots, means acting to spread apart the other ends of the fingers, a wedge shaped block interposed between the fulcrum ends of the fingers, and means for adjusting said block longitudinally of the fingers.

10. A clutch device comprising, in combination with a shaft and a gear or the like loosely mounted thereon, a clutch member non-rotatively fixed to the shaft and provided with a friction face adapted to engage a complemental friction face of said gear, two fingers pivotally mounted on said clutch member and fulcrumed one on the other adjacent to their pivots, means acting to spread apart the other ends of the fingers, a wedge shaped block interposed between the fulcrum ends of the fingers, and means for adjusting said block longitudinally of the fingers, the inclined faces of the wedge block converging towards the spreading ends of said fingers.

11. A clutch device comprising, in combination with a shaft and a gear or the like loosely mounted thereon, a clutch member non-rotatively fixed to the shaft and provided with a friction face adapted to engage a complemental friction face of said gear, two fingers pivotally mounted on said clutch member and fulcrumed one on the other adjacent to their pivots, means acting to spread apart the other ends of the fingers, a wedge block carried by one of said fingers and interposed between the fulcrum ends of said fingers, means for adjusting said block endwise of said fingers, the other finger being provided with a projection adapted to engage the adjacent inclined face of said wedge block.

12. A clutch device comprising, in combination with a shaft and a gear or the like loosely mounted thereon, a clutch member non-rotatively fixed to the shaft and provided with a friction face adapted to engage a complemental friction face of said gear, two fingers pivotally mounted on said clutch member and fulcrumed one on the other adjacent to their pivots, means acting to spread apart the other ends of the fingers, a wedge block interposed between the fulcrum ends of said fingers adjacent to their pivots and converging towards the spreading ends of the fingers, a screw-threaded shank carried by said block, one of said fingers having an apertured lug through which said shank extends, and nuts engaging said shank for adjusting and holding in adjusted position said block, the other finger being provided with a projection bearing against the adjacent inclined face of said block.

13. A clutch mechanism comprising, in combination with a shaft and a gear wheel or the like loosely mounted thereon and provided with a recess having an internal friction face, a clutch member located in said recess and non-rotatively fixed to the shaft and provided with an external friction face adapted to engage the internal friction face in said recess, two fingers pivotally mounted on said clutch member and located within said recess, said fingers being fulcrumed one upon the other adjacent to their pivots and swinging in the plane of said clutch member, and means for spreading apart the fingers to expand the friction face of the clutch member into engagement with the friction face of the gear.

14. A clutch member comprising, in combination with a shaft and a gear wheel or the like loosely mounted thereon and provided with a recess having an internal friction face, a clutch member located in said recess and non-rotatively fixed to the shaft and provided with an external friction face adapted to engage the internal friction face in said recess, two fingers pivotally mounted on said clutch member and located in said recess, said fingers being fulcrumed one upon the other adjacent to their pivots and swinging in the plane of said clutch member, and a hand lever pivoted to a part fixed to said shaft and provided with an extension which enters between said clutch fingers remote from their pivots and operating upon the swinging movement of the lever to spread apart the ends of the clutch fingers.

15. A clutch member comprising, in combination with a shaft and a gear wheel or the like loosely mounted thereon and provided with a recess having an internal friction face, a clutch member located in said recess and non-rotatively fixed to the shaft and provided with an external friction face adapted to engage the internal friction face in said recess, two fingers pivotally mounted on said clutch member and located in said recess, said fingers being fulcrumed one upon the other adjacent to their pivots and swinging in the plane of said clutch member, a hand lever pivoted to a part fixed to said shaft and provided with an extension which enters between the clutch fingers remote from their pivots and operating upon the swinging movement of the lever to spread apart the ends of the clutch fingers, and means for locking said lever in the latter position.

16. A clutch member comprising, in combination with a shaft and a gear wheel or the like loosely mounted thereon and provided with a recess having an internal friction face, a clutch member located in said recess and non-rotatively fixed to the shaft and provided with an external friction face adapted to engage the internal friction face in said recess, two fingers pivotally mounted on said clutch member and located in said recess, said fingers being fulcrumed one upon the other adjacent to their pivots and swinging in the plane of said clutch member, and a hand lever pivoted to a part fixed to said shaft and provided with an extension which enters between said clutch fingers remote from their pivots and operating upon the swinging movement of the lever to spread apart the ends of the clutch fingers, said lever being arranged to constitute means for rotating said shaft relatively to the gear when the clutch is released.

In testimony, that I claim the foregoing as my invention I affix my signature in the presence of two witnesses, this 1st day of October A. D. 1907.

ALBERT W. WIGGLESWORTH.

Witnesses:
WILLIAM L. HALL,
GEORGE R. WILKINS.